May 26, 1959 H. GOTTMANNS 2,887,720
MULTI-SPINDLE WORM-PRESS
Filed June 21, 1957
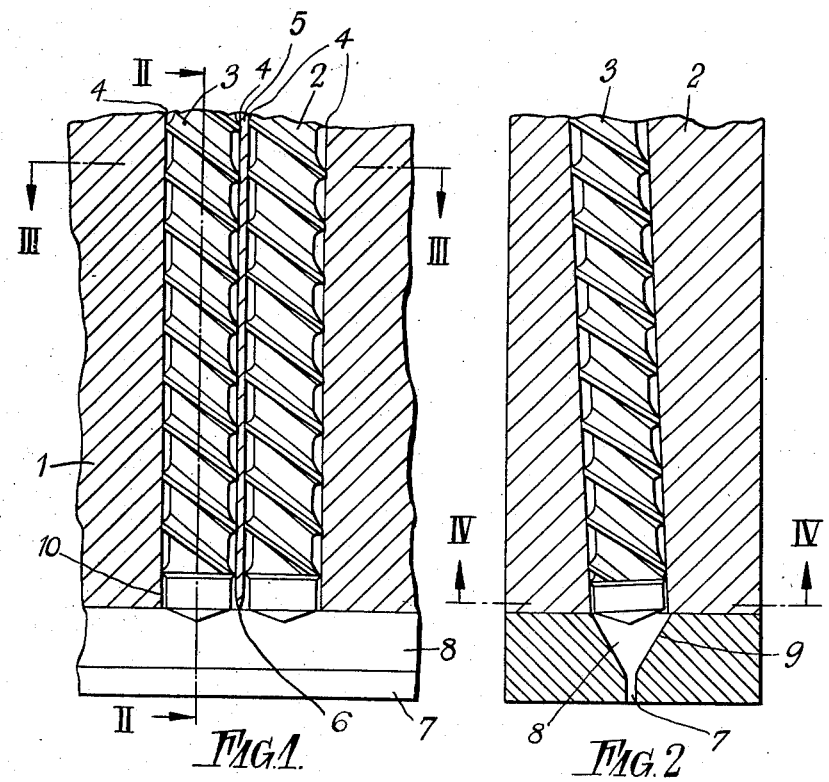
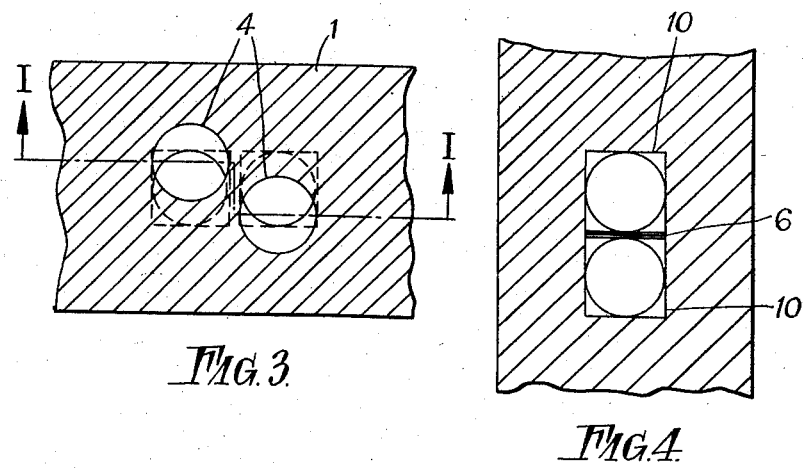

United States Patent Office 2,887,720
Patented May 26, 1959

2,887,720
MULTI-SPINDLE WORM-PRESS

Heinz Gottmanns, Spich, Germany, assignor to Dynamit-Actien-Gesellschaft vormals Alfred Nobel & Co., Troisdorf, Germany, a German company Application June 21, 1957, Serial No. 667,267

3 Claims. (Cl. 18—12)

This invention relates to a multi-spindle screw press.

In the screw presses of the form usually employed in industry, comprising a plurality of juxtaposed bores each having disposed therein a screw spindle, the distance between the axes of the spindles is determined by the size of the driving elements, such as gear wheels and couplings. With small spindle diameters, this distance is normally not less than the value of two screw spindle diameters. This causes difficulty in the design of a longitudinally extending common slotted outlet member for the individual screw spindles, especially when the latter are arranged in a housing and have a common outlet. In the latter arrangement, the common outlet member also constitutes a junction between the outlets of the screw spindles and the common outlet slot, and also equalizes the delivery from each of the individual screws.

Despite many attempts to design an outlet member in an appropriate manner for the aforesaid purpose, it has not heretofore been found possible to produce satisfactory equality in the rate of flow of extruded material at all points of the entire cross-section of the outlet member and thus to produce appropriate flow rates. As a consequence of the unequal flow rates, it has been found with relatively heat-sensitive material that stripes are formed on the extruded webs at the points of separation of the adjacent screw spindles. In order to overcome these difficulties, therefore, it is desirable to dispose the screw spindles as close as possible together, but this has been limited as stated above by the size of the driving elements.

In accordance with the invention, it is proposed to dispose the individual spindles of each pair of screw spindles in a multi-spindle screw press comprising a longitudinally extending outlet member having an outlet mouth in planes which substantially include the longitudinally extending outlet mouth but which diverge in a direction away from said outlet mouth. As a result of the disposition of the individual spindles of each pair of spindles so much space is gained that the driving devices, such as gear wheels or couplings, can be mounted on each screw spindle, and each screw spindle can be separately driven, while on the other hand, adjacent screw spindles can be brought so close together as to leave between them at their delivery end merely a knife-edge partition, the distance from the delivery end of each individual spindle to the common outlet slot preferably not being substantially greater than the diameter of the bore within which the screw spindle is disposed. This results in such a positioning of the spindles that, as seen in cross-section, they are separated from one another only by a narrow intervening wall partition.

One constructional form of a multi-spindle screw press is illustrated in the drawings, in which:

Fig. 1 is a horizontal section, on the line I—I of Fig. 3, of a multi-spindle screw press (only one pair of screw spindles is shown) it being assumed that the sectional plane through each of the screw spindles is inclined at an angle to the plane of the paper so as to include the longitudinal axis of each screw spindle, Fig. 2 is a section on the line II—II of Fig. 1, Fig. 3 is a section on the line III—III of Fig. 1, and Fig. 4 is a section on the line IV—IV of Fig. 2.

Referring now more particularly to the drawings in which like reference characters refer to like parts, screw spindles 2 and 3 are disposed in a pair of bores 4 formed in a housing 1, the bores being separated from each other by an intervening wall partition 5 which terminates in a knife-edge 6. A longitudinally extending outlet slot 7 communicates with the spindles 2 and 3 by means of a longitudinally extending passageway 8 the walls 9 of which are planar and converge towards the slot 7. Each bore 4 has a delivery end 10 having a square cross-section which end 10 communicates with the passageway 8.

As can be seen most clearly in Fig. 2, the axes of the bores 2 and 3 are contained in planes which substantially include the longitudinally extending outlet slot 7 but which diverge in a direction away from said outlet slot.

The various screw spindles in the screw press therefore all deliver to a common delivery slot, the length of which is substantially greater than its width.

This arrangement is particularly advantageous for the working of particularly temperature-sensitive materials, for example thermoplastic resins, such as P.V.C., and is therefore particularly suitable for the production of foils, plates and strip material.

I claim:

1. A multi-spindle screw press, comprising a longitudinally extending outlet member having an outlet mouth, a housing to which said outlet member is attached and having a plurality of non-intersecting bores formed therein and separated from one another by intervening wall partitions, all said bores opening at one end into said mouth and being arranged in pairs with the axes of the bores of each pair forming skew lines and being contained in planes which substantially include the entire length of the longitudinally extending outlet mouth but which diverge in a direction away from said outlet mouth, screw spindles disposed one in each of said bores, and driving means for said spindles disposed at the divergent ends of said bores.

2. A multi-spindle screw press according to claim 1, in which said outlet member comprises a first portion having a longitudinally extending outlet slot and a second portion lying between said first portion and said housing and having therein a longitudinally extending passageway the walls of which are planar and converge towards said slot.

3. A multi-spindle screw press according to claim 1, in which each said bore is bounded by walls comprising a cylindrical wall portion and a square section wall portion located to open into said outlet mouth, whereby adjacent bores have between them at the location of said outlet mouth a knife-edge partition.

References Cited in the file of this patent

UNITED STATES PATENTS 2,466,934     Dellenbarger _____ Apr. 12, 1949

FOREIGN PATENTS 1,011,179     France _____ June 19, 1952
879,861     Germany _____ June 15, 1953